Dec. 24, 1957     L. E. WETTSTEIN     2,817,542
LOAD EQUALIZING TRAILER HITCH
Filed Nov. 30, 1956     2 Sheets-Sheet 1
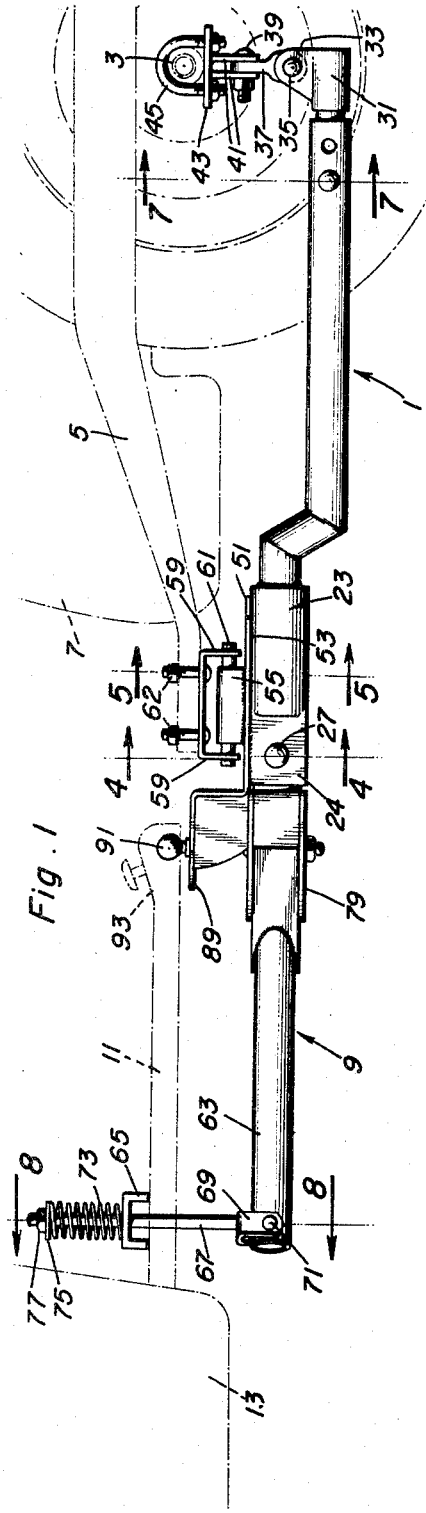
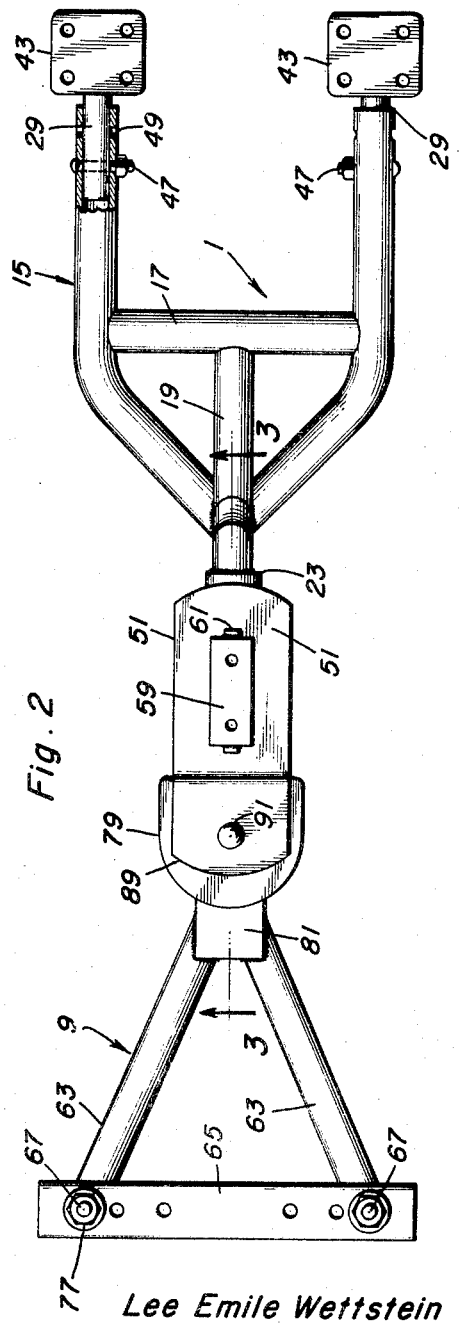
Lee Emile Wettstein
INVENTOR.
BY *Clarence A. O'Brien*
*and Harvey B. Jackson*
Attorneys Dec. 24, 1957 L. E. WETTSTEIN 2,817,542
LOAD EQUALIZING TRAILER HITCH
Filed Nov. 30, 1956 2 Sheets-Sheet 2
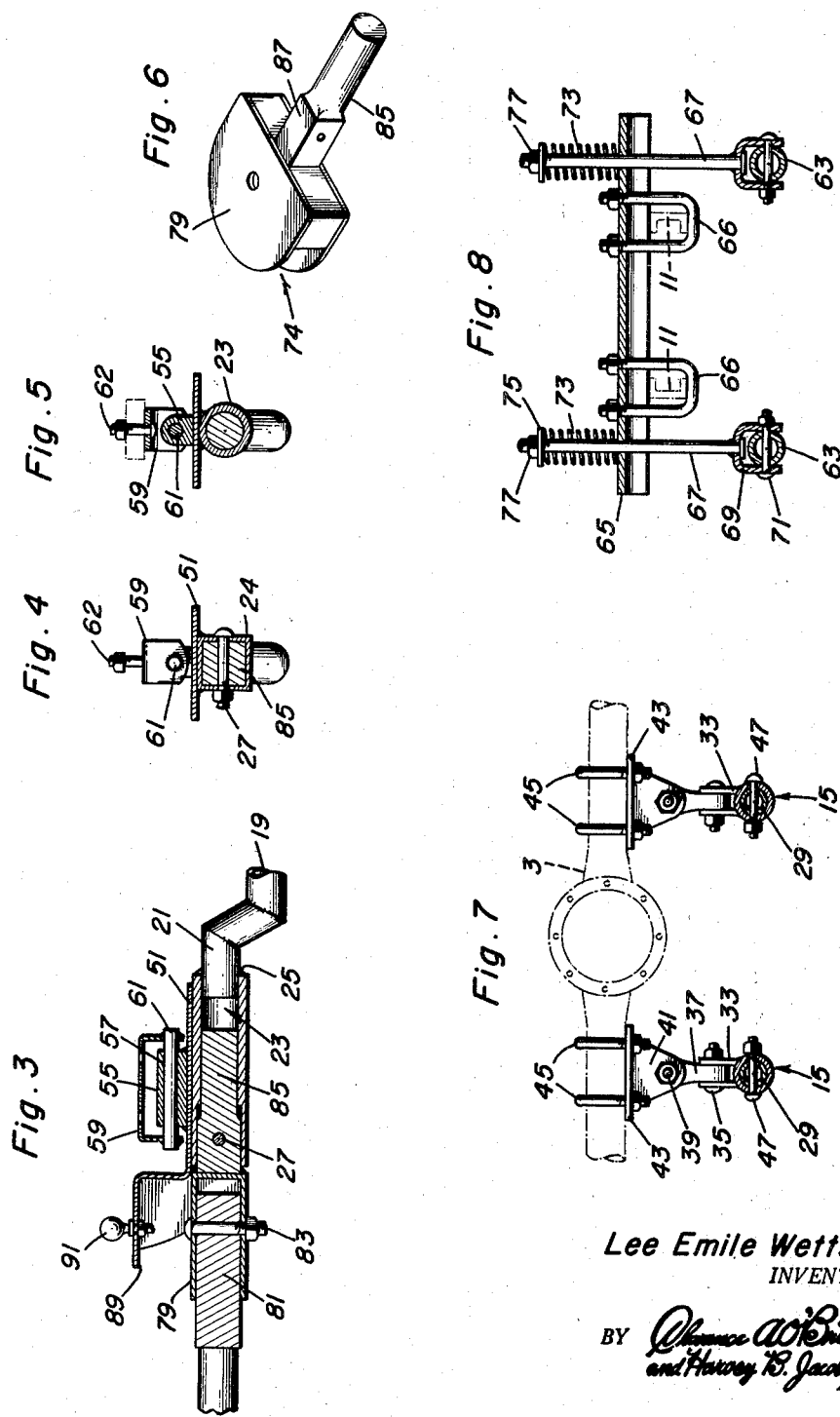
Lee Emile Wettstein
INVENTOR.

2,817,542
LOAD EQUALIZING TRAILER HITCH

Lee Emile Wettstein, Marion, Ind.

Application November 30, 1956, Serial No. 625,479

4 Claims. (Cl. 280—406)

My invention relates to load equalizing hitches for coupling an automobile and trailer and is designed as an improvement over the trailer hitch forming the subject matter of my copending application Ser. No. 445,247, filed July 23, 1954, and now Patent No. 2,772,893.

The principal object of this invention is to simplify such hitches without sacrificing any of the advantages thereof, to reduce the cost of manufacture of the same, and to provide for more efficient operation as regards leveling an automobile and trailer to prevent the load of the trailer from tilting the automobile downwardly and thereby displacing the headlights.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation partly in broken lines of my improved hitch coupling an automobile and trailer together;

Figure 2 is a view in plan of the hitch detached;

Figure 3 is a fragmentary view in vertical longitudinal section taken on the line 3—3 of Figure 2;

Figure 4 is a view in vertical cross-section taken on the line 4—4 of Figure 1;

Figure 5 is a view in vertical section taken on the line 5—5 of Figure 1;

Figure 6 is a fragmentary view in perspective of part of means for coupling a tow frame and draft frame of the hitch;

Figure 7 is a fragmentary view partly in vertical cross-section and partly in broken lines taken on the line 7—7 of Figure 1, and Figure 8 is a fragmentary view in vertical cross-section taken on the line 8—8 of Figure 1.

Referring to the drawings by numerals, my improved hitch comprises a tow frame, designated generally by the numeral 1, adapted to be mounted in underslung horizontal position on the rear axle housing 3 and the rear end of the chassis frame 5 of an automobile 7 and a draft frame, designated generally by the numeral 9, adapted to be mounted in horizontal underslung position on the conventional V-shaped draft tongue 11 of a house trailer 13.

The tow frame 1 is of tubular metal and comprises a front end fork 15 having a cross brace 17 from which a reach portion 19 extends rearwardly and is formed with an upwardly offset rear horizontal end portion 21 from which a metal sleeve 23 having a front end 24 of rectangular cross-section extends rearwardly and is welded thereto as at 25. The sleeve 23 forms a socket forming part of the coupling means between said frames 1, 9 and presently further described. A transverse coupling pin 27 extends horizontally through the sleeve 23.

Means for mounting the tow frame 1 on the axle housing 3 is provided comprising a pair of tubular extension members 29 extending forwardly out of the front ends of the fork 15 terminating in bushings 31 having pairs of upstanding ears 33 straddling and pivoted by bolts 35 to suspension links 37 pivotally suspended by bolts 39 between pairs of depending ears 41 on attaching plates 43 secured by U-bolts 45 to the bottom of the axle housing 3. The bolts 35 are parallel to and the bolts 39 transverse to the axle housing 3 so that the tow frame may fulcrum vertically on its mounting means for attaching the same to the rear end of the chassis frame and so that the pull of the tow frame and hitch is against the axle housing 3. Cross bolts 47 on the extension members 29 insertable in selected longitudinally spaced apertures 49 in the fork 15 provide for adjusting said frame 1 longitudinally for attachment to the rear end of chassis frame 5 extending different distances rearwardly of said housing 3.

The rear end of the tow frame 1 is attached to the rear end of the chassis frame 5 by the following means. A horizontal hitch plate 51 surmounts and is welded, as at 53, to the sleeve 23 and is provided with an upstanding boss 55 extending longitudinally of the line of draft and longitudinally bored as at 57. An attaching yoke 59 straddles the boss 55, carries a shaft 61 slidably extending through the bore 57 and is bolted as at 62 to the rear end of the chassis frame 5 beneath the same, the arrangement being such that the yoke 59 is connected to the tow frame 1 for limited sliding movement of the chassis frame 5 relative to the tow frame 1 to compensate for vertical movement of chassis frame on the automobile springs not shown. An upwardly offset downwardly opening channel guard 89 for a purpose presently explained is formed on the hitch plate 51 in the rear of the sleeve 23.

The draft frame 9 comprises forwardly converging tubular sides 63 and is mounted at its rear ends on the draft tongue 11 for vertical swinging by the following means. A channel bar 65 traverses the tongue 11 and is suitably fixed thereon by U-bolts 66. A pair of rods 67 vertically slidably extend through opposite ends of said bar and are provided on their lower ends with clevises 69 straddling the rear ends of the sides 63 and secured thereto by transverse pivot bolts 71. A pair of coil springs 73 on the rods 67 are interposed between the bar 65 and washers 75 secured on said rods by nuts 77.

The coupling means between frames 1, 9 comprises in addition to the sleeve 23 and coupling pin 27 a joint connection 74 on the front end of the draft frame 9 adapted to be detachably coupled to the sleeve 23. This connection comprises a horizontal semi-cylindrical yoke 79 straddling the front end 81 of the draft frame 9, a vertical pivot bolt 83 extending through said yoke 79 and end 81 and a forwardly extending stud 85 on said yoke slidably extending into the sleeve 23 and having a squared portion 87 fitting in the end 24 to dispose the yoke 79 horizontally and through which the coupling pin 27 is removably extended for coupling and uncoupling the joint connector 74 relative to the draft frame 1. The described joint connection 74 provides for relative swinging of the frames 1, 9 about a vertical axis for steering purposes while preventing the frames 1, 9 from buckling vertically on each other.

The downwardly opening vertically offset channel guard 89 on the rear of the hitch plate 51 overlies and guards the joint connection 74 and is provided thereon in vertical alignment with the pivot bolt 83 with the conventional hitch ball 91 for connection thereto of a conventional terminal hitch socket 93 on the draft tongue 11.

The operation of my improved hitch will be readily understood. The weight of the trailer 13 is pulled entirely by the axle housing 3 of the automobile 17. Vertical movement of the chassis frame 5 relative to the hitch is compensated for by relative sliding of the attaching yoke 59 and the draft frame 1. The coil springs 73 tend to lift the hitch upwardly on the pivot bolts 35 to exert a lift on the rear end of the chassis frame 5 to maintain said frame and the trailer level and the upward lift exerted may be varied by variably compressing the springs 73 in response to tightening of the nuts 77.

What is claimed as new is as follows:

1. A hitch comprising a tow frame adapted to extend rearwardly from a rear axle housing and the rear end of an automobile chassis frame, a draft frame adapted to extend forwardly under a draft tongue of a trailer having a terminal hitch socket on said tongue, means on said tow frame attachable to said rear axle housing to prevent movement of the tow frame transversely of said axle housing and pivoting said tow frame for vertical swinging, coupling means terminally coupling said tow and draft frames together against relative vertical movement and including a vertical pivot about which said frames may swing laterally for steering of an automobile and trailer, means on said tow frame slidable longitudinally thereof and attachable to a rear end of said chassis frame to mount said tow frame on a rear end of a chassis frame and permit said chassis frame to move longitudinally of the tow frame, a rearwardly extending guard on said tow frame overlying said pivot and having a hitch ball thereon vertically aligned with said pivot for pivotally seating said hitch socket, and spring tensioned means attachable to said draft tongue for mounting the draft frame on said draft tongue attached to the rear end of the draft frame and acting to lift said draft and tow frames to thereby maintain said chassis frame level.

2. The combination of claim 1, said coupling means comprising a horizontal terminal sleeve on said tow frame, a horizontal yoke straddling said draft frame, said pivot extending through said horizontal yoke and draft frame, a forwardly extending stud on said horizontal yoke extending into and fitting in said terminal sleeve, and a transverse coupling pin removably extended through said terminal sleeve and stud.

3. The combination of claim 1, said means on said tow frame comprising a sliding yoke attachable to said rear end of said chassis frame, a boss on said tow frame straddled by said sliding yoke and a shaft in said sliding yoke slidable in said boss.

4. A hitch comprising a tow frame adapted to extend rearwardly from a rear axle housing and the rear end of an automobile chassis, a draft frame adapted to extend forwardly under a draft tongue of a trailer having a terminal hitch socket on said tongue, means on said tow frame attachable to said rear axle housing to prevent movement of the tow frame rearwardly of said axle housing and pivoting said tow frame for vertical swinging, coupling means terminally coupling said tow and draft frames together against relative vertical movement and including a vertical pivot about which said frames may swing laterally for steering of an automobile and trailer, means on said tow frame slidable longitudinally thereof and attachable to a rear end of said chassis to mount said tow frame on a rear end of a chassis and permit said chassis to move longitudinally of the tow frame, a rearwardly extending guard on one of said frames overlying said pivot and having a hitch ball thereon vertically aligned with said pivot for pivotally seating said hitch socket, and spring tensioned means attachable to said draft tongue for mounting the draft frame on said draft tongue attached to the rear end of the draft frame and acting to lift said draft and tow frames to thereby maintain said chassis level.

References Cited in the file of this patent

UNITED STATES PATENTS 2,680,626     Hedgpeth _____ June 8, 1954